United States Patent
Ji et al.

(10) Patent No.: US 12,429,614 B2
(45) Date of Patent: Sep. 30, 2025

(54) FLEXIBLE AND RAPID DEPLOYABLE FIELD MONITORING SYSTEM

(71) Applicant: NEC LABORATORIES AMERICA, INC., Princeton, NJ (US)

(72) Inventors: Philip Ji, Cranbury, NJ (US); Christopher White, Neshanic Station, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 272 days.

(21) Appl. No.: 18/311,881

(22) Filed: May 3, 2023

(65) Prior Publication Data

US 2024/0118116 A1    Apr. 11, 2024

Related U.S. Application Data

(60) Provisional application No. 63/338,427, filed on May 4, 2022, provisional application No. 63/338,425, filed on May 4, 2022.

(51) Int. Cl.
| | |
|---|---|
| G01V 1/22 | (2006.01) |
| G01D 5/353 | (2006.01) |
| G01H 9/00 | (2006.01) |
| G01V 1/00 | (2024.01) |
| G01V 1/16 | (2006.01) |
| G02B 6/46 | (2006.01) |
| H02G 1/06 | (2006.01) |

(52) U.S. Cl.
CPC ......... G01V 1/226 (2013.01); G01D 5/35358 (2013.01); G01H 9/004 (2013.01); G01V 1/001 (2013.01); G01V 1/168 (2013.01); *G01V 2210/1425* (2013.01); *G02B 6/46* (2013.01); *H02G 1/06* (2013.01)

(58) Field of Classification Search
CPC ........... G01V 1/226; G01V 2210/1425; G01D 5/35358
See application file for complete search history.

(56) References Cited

U.S. PATENT DOCUMENTS

2007/0119997 A1* 5/2007 Boon .................... H02G 11/02 242/159
2010/0089226 A1* 4/2010 Jones .................... F42B 39/26 89/1.1

(Continued)

*Primary Examiner* — Thomas S Mccormack
(74) *Attorney, Agent, or Firm* — Joseph Kolodka

(57) ABSTRACT

A flexible, rapid deployable perimeter monitoring system and method that employs distributed fiber optic sensing (DFOS) technologies and includes a deployment/operations field vehicle including an interrogator and analyzer/processor. The deployment/operations field vehicle is configured to field deploy a ruggedized fiber optic sensor cable in an arrangement that meets a specific application need, and subsequently interrogate/sense via DFOS any environmental conditions affecting the deployed fiber optic sensor cable. Such sensed conditions include mechanical vibration, acoustic, and temperature that may be advantageously sensed/evaluated/analyzed in the deployment/operations vehicle and subsequently communicated to a central location for further evaluation and/or coordination with other monitoring systems. Upon completion, the field vehicle and DFOS reconfigure a current location or redeployed to another location.

8 Claims, 5 Drawing Sheets

(56) References Cited

U.S. PATENT DOCUMENTS

2010/0117830 A1* 5/2010 Strong .................. G01H 9/004
340/555
2018/0121571 A1* 5/2018 Tiwari .................. G08B 19/00

* cited by examiner

FLEXIBLE AND RAPID DEPLOYABLE FIELD MONITORING SYSTEM

CROSS-REFERENCE TO RELATED APPLICATIONS

This application claims the benefit of U.S. Provisional Patent Application Ser. No. 63/338,425 filed May 4, 2022, and U.S. Provisional Patent Application Ser. No. 63/338,427 filed May 4, 2022, the entire contents of each are incorporated by reference as if set forth at length herein.

FIELD OF THE INVENTION

This application relates to the perimeter monitoring of an area that may be established dynamically. More particularly, it pertains to a flexible, rapidly deployable perimeter monitor system employing distributed fiber optic sensing (DFOS).

BACKGROUND OF THE INVENTION

There exist many real-world situations that require urgent, time-critical monitoring of a geographic area. Examples of such situations include humanitarian crises, natural disasters, and disease outbreaks that necessitate the establishment of specialized sites such as refugee camps, emergency housing, and temporary medical facilities. Providing physical security at such sites is of great concern, as permanent security and/or monitoring facilities cannot be deployed/installed quickly. Additionally, given the unpredictable and/or dynamic nature of such real-world situations, permanent structures may be too inflexible.

More particularly, watch stations require people deployed at various locations along a perimeter, which is both inefficient and of limited effectiveness. Commonly deployed detector systems such as infra-red systems and/or visible camera systems may require a substantial electrical and/or networking infrastructure, which may not be established quickly. Finally, aerial drone/unmanned aerial vehicle (UAV) monitoring may not be suitable for long-term operation as such drone/UAV monitoring exhibits limited aerial time before refueling/recharging.

In a battlefield context, a monitoring system may provide dynamic barrier functionality, such that a monitored area serves as a barrier and the monitoring determines specific types of objects approaching, within, or exiting the monitored barrier area. Depending upon the type of object(s), the monitoring system may initiate an appropriate action.

Accordingly, a flexible and rapidly deployable perimeter monitoring and barrier system for monitoring unpredictable and dynamic geographic areas over an extended period of time would be a welcome addition to the art.

SUMMARY OF THE INVENTION

An advance in the art is made according to aspects of the present disclosure directed to a flexible, rapid deployable perimeter monitoring system and method that employs distributed fiber optic sensing (DFOS) technologies.

Viewed from a first aspect, our flexible, rapid deployable perimeter monitoring system and method provides a dynamic barrier that is selective, i.e., able to engage a credible threat and initiate appropriate action. Viewed from this aspect, our inventive system includes a plurality of DFOS sensors deployed around a perimeter of a monitored area and determine specific types of objects approaching, within, or exiting the area. Depending upon the type of objects so determined, the system may initiate an appropriate action.

In this context our inventive perimeter monitoring system responds to the type of objects sensed in the monitored area with appropriate force. Accordingly, our inventive perimeter monitoring system may permit the presence or passage of authorized objects (i.e., friendly forces). In this inventive manner, our inventive perimeter monitoring system may be emplaced and then provide a form of self-protection whereby it senses an object, determines its type, and responds appropriately.

In sharp contrast to the prior art, our inventive DFOS flexible, rapid deployable monitoring includes a deployment/operations field vehicle including an interrogator and analyzer/processor. The deployment/operations field vehicle is configured to field deploy a ruggedized fiber optic sensor cable in an arrangement that meets a specific application need, and subsequently interrogate/sense via DFOS any environmental conditions affecting the deployed fiber optic sensor cable. Such sensed conditions include mechanical vibration, acoustic, and temperature that may be advantageously sensed/evaluated/analyzed in the deployment/operations vehicle and subsequently communicated to a central location for further evaluation and/or coordination with other monitoring systems.

Advantageously, our inventive system and method provides real-time sensory data/information including accurate location information for sensed events. Of particular advantage, the fiber optic sensor cable may be retrieved upon conclusion of any circumstances leading to its deployment, and subsequently redeployed and/or rearranged at its current location—or another—as needs dictate. Of further advantage, flexible, rapid deployable perimeter monitoring systems and methods according to the present invention monitor large area(s), provide a large number of sensing points, accurate location information, flexible deployment and redeployment, automatic information synchronization, ruggedized for all terrain and environmental conditions, does not require any line-of-sight configuration, and provides continuous, real-time day/night monitoring of both underground and aboveground locations.

Finally, when deployed/operated in a battlefield context, our inventive monitoring system provides dynamic barrier functionality, such that a monitored area serves as a barrier and the monitoring determines specific types of objects approaching, within, or exiting the monitored barrier area. Depending upon the type of object(s), the monitoring system may initiate an appropriate action, both lethal and non-lethal. Of particular importance, our inventive monitoring system may be deactivated/retrieved/redeployed upon completion of a specific mission location without any difficult and/or dangerous removal such as may result from deployment of—for example—minefields.

DETAILED DESCRIPTION OF THE INVENTION

Figure 1A:
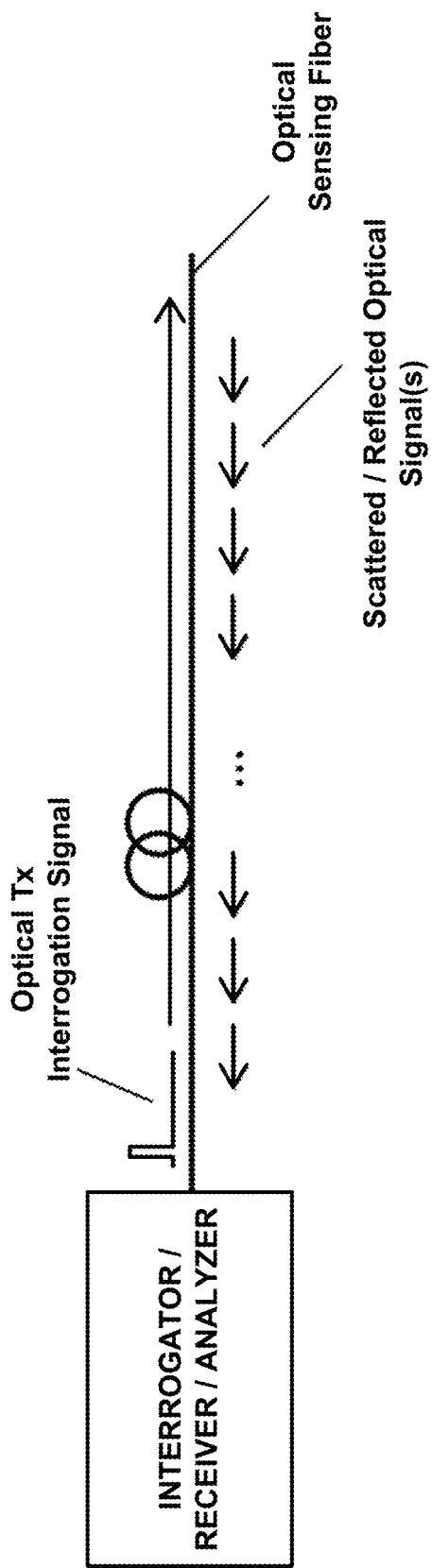
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
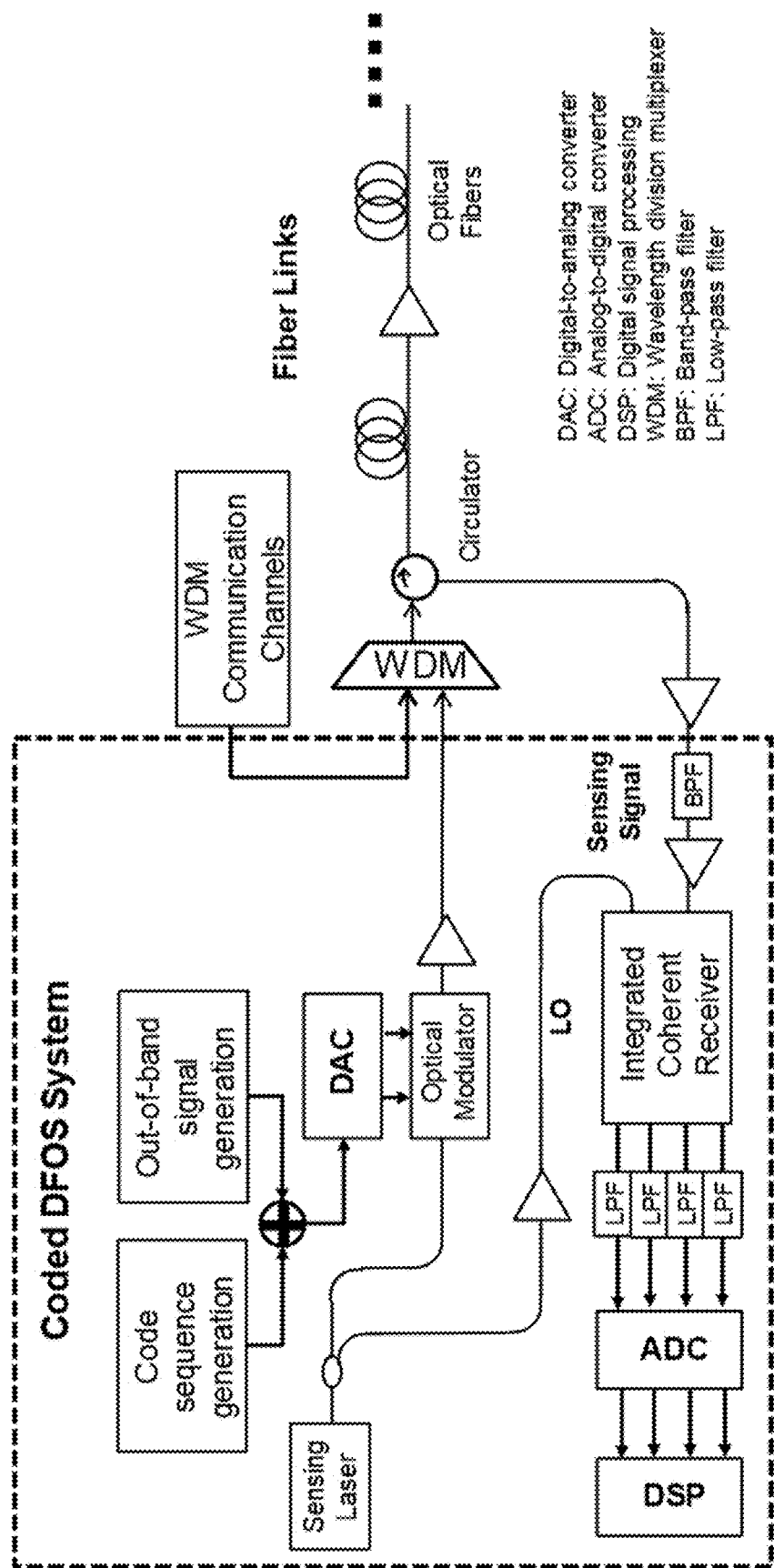

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Figure 2:
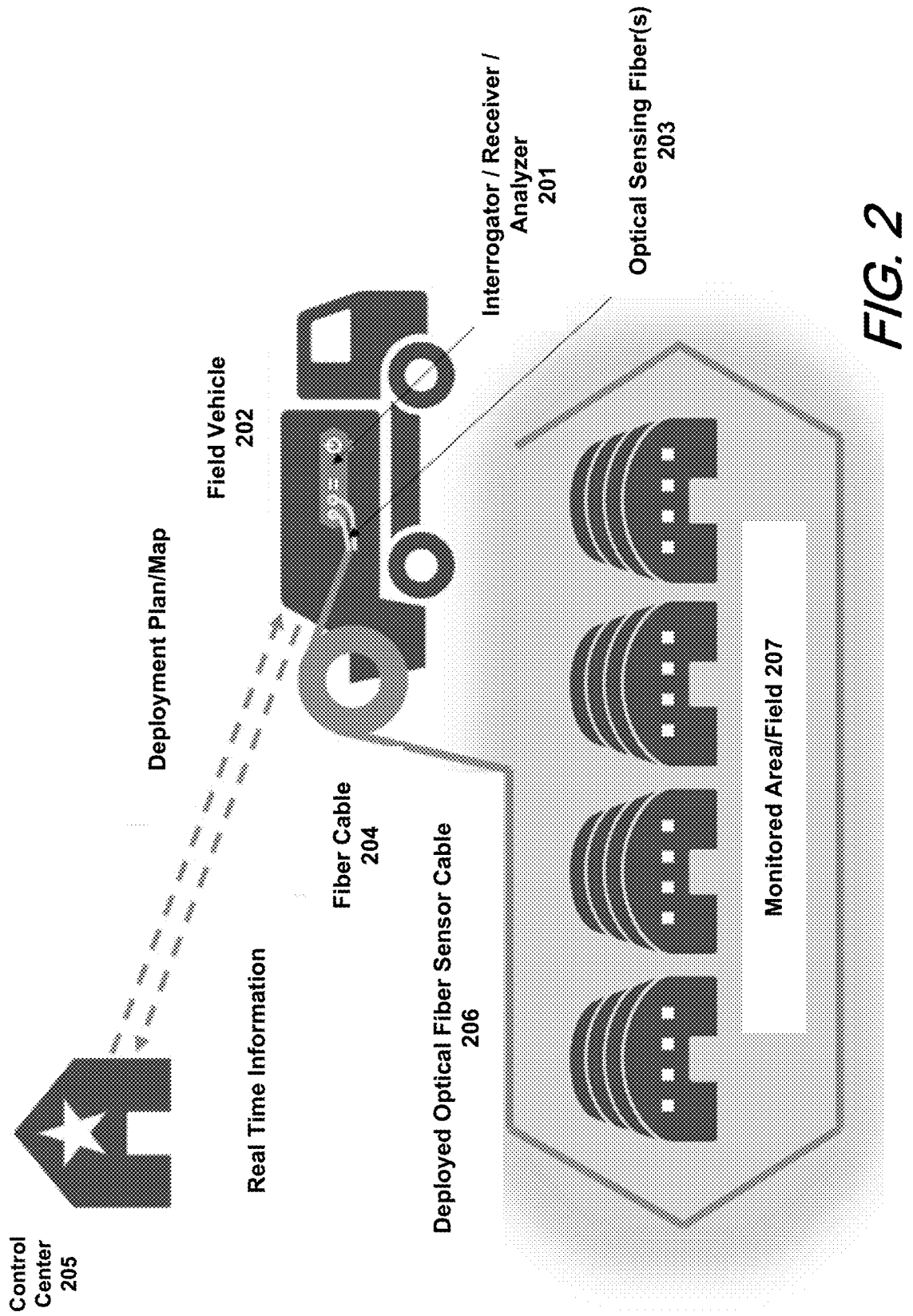
FIG. 2. Is a schematic diagram showing an illustrative flexible rapid deployable perimeter monitoring system and operational overview according to aspects of the present disclosure.

FIG. 2. Is a schematic diagram showing an illustrative flexible rapid deployable perimeter monitoring system and operational overview according to aspects of the present disclosure. With reference to that figure, it may be observed that a monitored area/field 207 is defined by a deployed optical fiber sensing cable 206 positioned around a perimeter of the monitored area. Shown further is field vehicle 202 which is outfitted with one or more spools of fiber cable 204 which become deployed resulting from movement of the field vehicle. We note that the field vehicle may be self-propelled, or a trailer or other structure that is towed by another vehicle. Additionally, and advantageously, while FIG. 2 shows an illustrative wheeled field deployment vehicle, such deployment operation of the optical fiber sensor cable may be performed by wheeled, tracked, or floating vehicles depending upon the area to be monitored. Finally, and as will be understood and appreciated by those skilled in the art, the field vehicle may be autonomous or remotely controlled such that a human driver/operator need not be present for its operation.

Operationally, our inventive system and method according to the present disclosure includes a control center 205 which may be remote from the monitored area 207, and the monitored area/field 207 itself which, as we have noted, is generally defined by a perimeter according to the deployment position of the optical fiber sensor cable 206 that is positioned by the locomotion of the field vehicle 202. As we shall show and describe in greater detail, the control center wirelessly provides the field vehicle with a deployment plan map and receives real-time DFOS information generated by the operation of the vehicle mounted DFOS system. As will be appreciated by those skilled in the art, the deployment plan map may change during the course of operation, and may also include control and navigation information that permits autonomous vehicular operation.

As we have previously noted, our inventive flexible rapid deployable field monitoring system and method according to the present disclosure is based on distributed fiber optic sensing technology which utilizes the backscattering (such as Rayleigh backscattering, Brillouin backscattering, and Raman backscattering) of an incident optical interrogation signal injected into an optical fiber sensor cable to monitor various environmental conditions and/or physical phenomena (such as temperature, vibration, strain, etc.) that occur over the length of the optical fiber sensor cable deployed along a perimeter of a desired area. As those skilled in the art will understand and appreciate, the optical fiber sensor cable of the DFOS system effectively acts as a multitude of individual sensors along the length of the optical fiber sensor cable providing very long-distance monitoring (for example—many kilometers) and fine spatial resolution. Advantageously, our backscattering sensing methods are open ended, and the length of the optical fiber sensor cable can be extended or shortened by deploying/retrieving the optical fiber sensor cable to/from the spool mounted on the field vehicle.

With continued reference to FIG. 2, we note that according to aspects of the present disclosure, DFOS sensor equipment 201, including an interrogator and optionally a field analyzer, is advantageously located in/on field vehicle 202. In an illustrative configuration, such an interrogator may include one or more optical fiber ports that can advantageously interrogate/sense simultaneously one or more sensing fibers included in the deployed optical fiber sensor cable 203.

Shown at the rear of the field vehicle is a spool of optical fiber sensing cable 204. Such cable may include various shielding layers (such as Polyethylene jacket, steel tap armor, aluminum tap armor, strength member, aramid yarn, etc.) to ruggedize it for operation in harsh environments while still exhibiting a workable physical flexibility. Such optical fiber sensing cable will include one or more individual optical fibers which, as we have previously noted, may be individually interrogated/monitored by a multiple port interrogator operating in/on the field vehicle. When so configured, one end of the fiber optical fiber sensing cable that enters the vehicle is split into its individual component fibers, which in turn are individually connected to the multiple fiber ports on the interrogator. Advantageously, when multiple interrogator ports operate simultaneously, multiple physical phenomena can be individually monitored concurrently by such multi-functional interrogator.

As will be appreciated, the distal end (deployed far end) of the optical fiber sensing cable is open, and a simple termination is applied on each sensing fiber to prevent large reflection at that far end. Advantageously, if a need arises to change the optical fiber sensor cable length, such extension may be made by splicing another optical fiber sensor cable to the far end. Conversely, shortening the optical fiber sensor cable may be achieved by cutting that far end.

Figure 3:
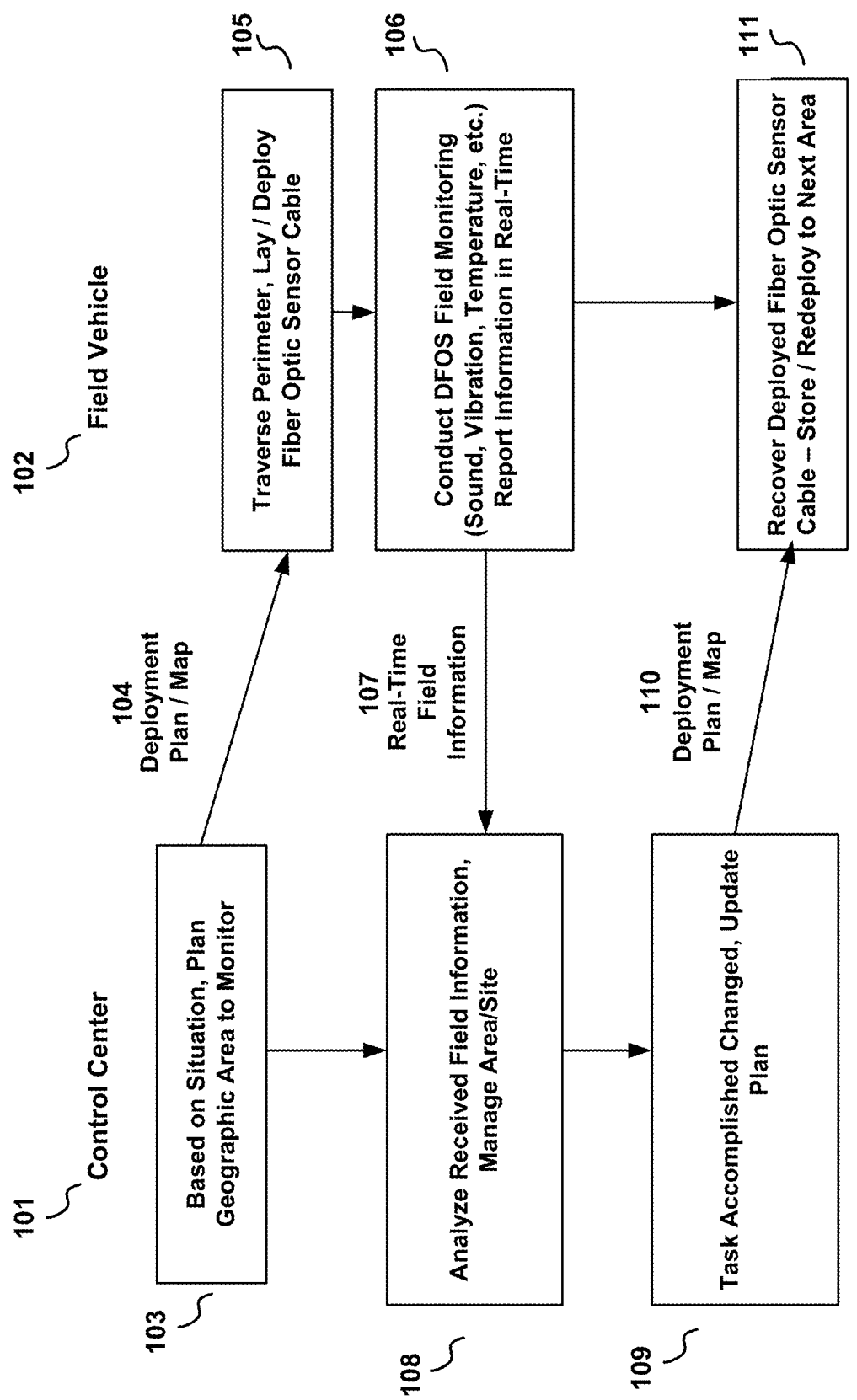
FIG. 3 is a schematic flow diagram showing illustrative interactions and operations between a control center and field vehicle.

FIG. 3 is a schematic flow diagram showing illustrative interactions and operations between a control center and field vehicle according to aspects of the present disclosure. With reference to that figure, it is shown that during operation, the control center 101 which, as we have previously noted may be remotely located away from the monitored area/field, at the monitored area/field, or within the monitored area/field, determines a geographic area to monitor to the field vehicle 102 based on a current situation (Step 103). The control center transmits a deployment plan (Step 104) which includes a map of the perimeter to be monitored and route information, to direct the field vehicle. The transmission of the deployment plan and any maps/routes are advantageously transmitted via any of a number of known/secured wireless communication channels.

Upon receipt of the deployment plan/map, the field vehicle relocates to a starting location of the field to be monitored and begins to deploy the fiber optic sensor cable from the spool of fiber optic sensor cable carried by the field vehicle (Step 105). The vehicle travels along an assigned route as indicated by the deployment plan/map while deploying the fiber optic sensor cable until the perimeter of the field/area to be monitored is defined. The field vehicle will then stay at a stationary location and operate the DFOS system to perform the sensor monitoring. By associating a deployment route, geophysical location, and the length on the fiber optic sensor cable, each sensing point along the length of the fiber optic sensor cable may be mapped to an actual physical field location.

We note at this point that it is possible during the deployment of the fiber optic sensor cable to operate the interrogator/analyzer and develop an operational model for a ML system that may be part of the interrogator/analyzer. In this inventive manner, the operational ML model may be trained to account for vehicular operation during subsequent deployment/redeployment that may be required as a result of changing environmental conditions.

During DFOS monitoring (Step 106), the interrogator located with the vehicle continuously interrogates and monitors the monitored field for environmental activity including acoustic/sounds, vibrations, and temperature, etc., as desired. An analyzer such as a separate computing device and/or ML-based data processor that is in communication with the interrogator/detector, which may be a separate computing device or integrated with the interrogator) processes the sensor data and analyzes same using various sensing-specific algorithms and techniques, which could include digital signal processing algorithms, heuristic algorithms, and machine learning-based algorithms.

Such field processing generates information about the monitored field including—for example—movement/location/specific types of persons/crowds, vehicles, drones, temperature(s), and acoustic events such as gunshots or explosions—among others. This information may be further employed to generate 3D directional information based on acoustic signal analysis; and temperature signal analysis. Advantageously, such information is generated and processed in real-time, and may employ the fine spatial resolution between measurement points—such as a few meters or shorter—provided by the DFOS. Of further advantage, sensing, processing, and information extraction may be performed automatically by the field deployed interrogator and analyzer located in the field vehicle. As a result, no human operation control or analysis is needed according to aspects of the present disclosure. Finally, any electrical power requirements may be provided in the field by the field vehicle.

This real-time field information is then sent to the control center (Step 107), where the monitored area situation is evaluated, and operational decisions are refreshed/updated as appropriate according to the evaluated situation (Step 108).

When the monitoring is accomplished, or if the monitored area of interest is changed (for example the monitored area is expanded or contracted or changed perimeter), the control center will update the deployment plan (Step 109) and transmit the updated deployment plan and map to the vehicle (Step 110). The vehicle will then collect the deployed fiber optic sensor cable by retracting/rewinding it back to the fiber optic sensor cable spool located on the field vehicle and relocate to a next location to deploy the fiber optic sensor cable according to the updated deployment plan (Step 111).

Figure 4:
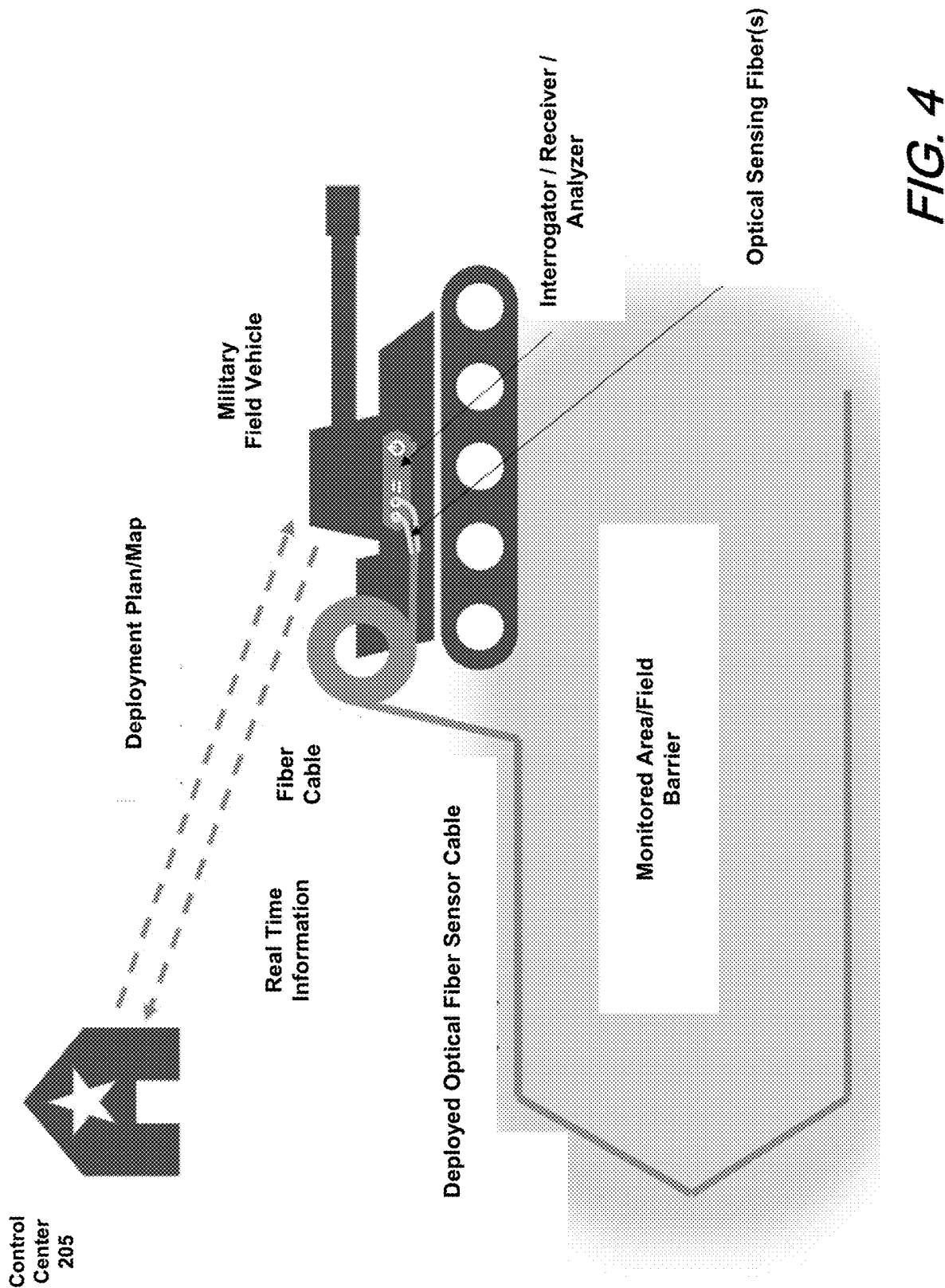
FIG. 4. Is a schematic diagram showing an illustrative flexible rapid deployable perimeter monitoring system and operational overview including military-type field vehicles according to aspects of the present disclosure.

FIG. 4. Is a schematic diagram showing an illustrative flexible rapid deployable perimeter monitoring system and operational overview including military-type field vehicles according to aspects of the present disclosure.

As those skilled in the art will understand and appreciate, a military vehicle is any vehicle for land-based military activity including combat, specifically designed for, or specifically used by military. Most military vehicles exhibit significant off-road capabilities and/or vehicle armor and weapons. Examples of such military vehicles include tanks, self-propelled howitzers, armored personnel carriers, and gunboats—among others—that are generally heavily armored vehicles that are used to engage enemy forces in combat and are typically equipped with cannons, guns, and other weapons including multiple rocket launchers.

Advantageously, when our inventive perimeter monitoring system is deployed in such a military context by a military vehicle, the system function as a dynamic barrier and selectively detect/determine whether an object is entering, within, or exiting a monitored area. Furthermore, our inventive perimeter monitoring system may determine an intent of such object—i.e., whether it is "friend or foe", and whether to engage such object and initiate appropriate action—both lethal and non-lethal.

In this context our inventive perimeter monitoring system responds to the type of objects sensed in the monitored area with appropriate force. Accordingly, our inventive perimeter monitoring system may permit the presence or passage of authorized objects (i.e., friendly forces). In this inventive manner, our inventive perimeter monitoring system may be emplaced and then provide a form of self-protection whereby it senses an object, determines its type, and responds appropriately.

In that regard, our flexible, rapid deployable perimeter monitoring system and method provides a dynamic barrier that is selective, i.e., able to engage a credible threat and initiate appropriate action.

Those skilled in the art will now understand and appreciate that our flexible rapid deployable perimeter monitor system and method according to the present disclosure provides numerous advantages over prior art methods. More particularly, our systems and methods provide:

Monitoring a large geographic area with a single sensor: For example, a typical DFOS/Distributed Acoustic Sensor (DAS) can monitor >40 km optical fiber sensor length, which can form a perimeter monitor of a 10 km×10 km square area, which is a 100 square km monitoring area.

A high sensitivity and can detect weak vibrations and low volume sounds at great distances traversed by an optical fiber sensor.

Fine spatial resolution at an accuracy level of a few meters or less.

Constant monitoring of a geographic area and operate day and night, in all weather conditions.

Simultaneous multiple phenomena detection as it can detect acoustic signal (sound), vibration (movement), temperature, etc. simultaneously.

Internal synchronization—although the system virtually has thousands of sensing points along the length of the fiber optic sensor cable, these points use the same pulsed optical source, therefore the detected signals are intrinsically synchronized, making it easy for MIMO processing to extract more information, such as 3D localization or data fusion.

Real-time information is provided as data and field information are produced in real-time for real-time situational awareness.

No line-of-sight limitation as our inventive system and method does not require line-of-sight for the monitoring operation.

Underground/Aboveground monitoring can both be detected by our inventive systems and methods.

Flexible deployment is achieved as a monitoring area and route can take any shape, and redeployed quickly in another location or a different shape/size.

Discrete—the fiber optic sensor cable may be difficult to detect and/or damage/destroy.

Secure/self-protection—intruders approaching the fiber optic sensor cable in an attempt to sabotage it, will be detected before they reach the sensor cable.

Rapid deployment—the deployment is performed as the vehicle travels along a deployment route and does not require trenching, anchoring, or otherwise fixing the cable. No electrical connection installation or network connection setup is required.

All terrain deployment—The optical fiber sensor is ruggedized and suitable for deployment on all kinds of terrain (rock, gravel, desert, grassland, wetland, snow covered ground, river, paved road, etc.) and harsh environments.

Easy teardown and redeployment with the vehicular mounted motorized cable spool.

Easy replacement of cable, and easy shortening or extension of cable due to the open-ended structure.

At this point, while we have presented this disclosure using some specific examples, those skilled in the art will recognize that our teachings are not so limited. Accordingly, this disclosure should be only limited by the scope of the claims attached hereto.

The invention claimed is:

1. A flexible rapid deployable perimeter monitoring system employing distributed fiber optic sensing (DFOS), the system comprising:
   a military-type field vehicle including
      a length of optical sensor fiber;
      an optical interrogator in optical communication with the length of optical sensor fiber, the optical interrogator configured to generate optical pulses from laser light, introduce the pulses into the optical sensor fiber and detect/receive backscattered/reflected signals from the optical sensor fiber, and determine environmental activity at one or more locations along the length of the optical sensor fiber from the backscattered/reflected signals detected/received;
   wherein the length of optical sensor fiber is deployed during movement of the field vehicle;

wherein deployed optical sensor fiber defines a perimeter of an area monitored by DFOS;
wherein the environmental activity at the one or more locations along the length of the optical sensor fiber include objects entering, within, and exiting the area monitored, and the system is configured to determine an identity of any objects entering, within, and exiting the area monitored;
wherein the system is further configured to initiate a response to the determined identity of an object entering, within, and exiting the area monitored wherein the response is one selected from the group consisting of lethal and non-lethal responses;
wherein the length of optical sensor fiber is provided on a spool attached to the field vehicle; and
wherein the determined environmental activities are relayed to a control center from the field vehicle in real-time.

2. A flexible rapid deployable perimeter monitoring system employing distributed fiber optic sensing (DFOS), the system comprising:
a military-type field vehicle including
a length of optical sensor fiber;
an optical interrogator in optical communication with the length of optical sensor fiber, the optical interrogator configured to generate optical pulses from laser light, introduce the pulses into the optical sensor fiber and detect/receive backscattered/reflected signals from the optical sensor fiber, and determine environmental activity at one or more locations along the length of the optical sensor fiber from the backscattered/reflected signals detected/received;
wherein the length of optical sensor fiber is deployed during movement of the field vehicle;
wherein deployed optical sensor fiber defines a perimeter of an area monitored by DFOS;
wherein the environmental activity at the one or more locations along the length of the optical sensor fiber include objects entering, within, and exiting the area monitored, and the system is configured to determine an identity of any objects entering, within, and exiting the area monitored;
wherein the system is further configured to initiate a response to the determined identity of an object entering, within, and exiting the area monitored wherein the response is one selected from the group consisting of lethal and non-lethal responses;
wherein the length of optical sensor fiber is provided on a spool attached to the field vehicle;
wherein the field vehicle operates in response to a field deployment plan and map; and
wherein the length of optical sensor fiber is one of a plurality of optical sensor fibers configured as a ruggedized cable, and the interrogator is configured to interrogate, a plurality of the optical sensor fibers in the ruggedized cable.

3. A flexible rapid deployable perimeter monitoring system employing distributed fiber optic sensing (DFOS), the system comprising:
a military-type field vehicle including
a length of optical sensor fiber;
an optical interrogator in optical communication with the length of optical sensor fiber, the optical interrogator configured to generate optical pulses from laser light, introduce the pulses into the optical sensor fiber and detect/receive backscattered/reflected signals from the optical sensor fiber, and determine environmental activity at one or more locations along the length of the optical sensor fiber from the backscattered/reflected signals detected/received;
wherein the length of optical sensor fiber is deployed during movement of the field vehicle;
wherein deployed optical sensor fiber defines a perimeter of an area monitored by DFOS;
wherein the environmental activity at the one or more locations along the length of the optical sensor fiber include objects entering, within, and exiting the area monitored, and the system is configured to determine an identity of any objects entering, within, and exiting the area monitored;
wherein the system is further configured to initiate a response to the determined identity of an object entering, within, and exiting the area monitored wherein the response is one selected from the group consisting of lethal and non-lethal responses;
wherein the length of optical sensor fiber is provided on a spool attached to the field vehicle;
wherein the field vehicle operates in response to a field deployment plan and map; and
wherein the field vehicle is self-propelled.

4. The flexible rapid deployable perimeter monitoring system of claim 3 wherein the self-propelled field vehicle operates autonomously.

5. A method of operating a flexible rapid deployable perimeter system employing distributed fiber optic sensing (DFOS), the method comprising:
providing a military-type field vehicle including
a length of optical sensor fiber located on a spool attached to the field vehicle;
an optical interrogator in optical communication with the length of optical sensor fiber, the optical interrogator configured to generate optical pulses from laser light, introduce the pulses into the optical sensor fiber and detect/receive backscattered/reflected signals from the optical sensor fiber, and determine environmental activity at one or more locations along the length of the optical sensor fiber from the backscattered/reflected signals detected/received;
providing a deployment plan and map to the field vehicle,
deploying the length of optical sensor fiber according to the deployment plan and map by operating the military-type field vehicle while deploying the length of optical sensor fiber;
operating the optical interrogator to obtain the determined environmental activity;
determining, from the determining environmental activity, objects entering, within, and exiting the area monitored, and identity of any objects entering, within, and exiting the area monitored; and
initiating a response to the object determinations said response selected from lethal and non-lethal responses;
wherein the military-type field vehicle is one selected from the group consisting of tank, armored personnel carrier, self-propelled howitzer, and gunboat and the determined response is provided by the military-type vehicle.

6. The method according to claim 5 further comprising transmitting the determined environmental activity to a control center for additional analysis in real-time.

7. The method according to claim 6 further comprising updating the deployment plan and map and providing the updated plan and map to the field vehicle.

8. The method according to claim 7 further comprising redeploying the field vehicle according to the updated plan and map.

* * * * *